(12) United States Patent
Steinlage et al.

(10) Patent No.: US 6,502,644 B2
(45) Date of Patent: Jan. 7, 2003

(54) LEVELING WHEEL STRUCTURE FOR A MINIMUM TILLAGE RIPPER

(75) Inventors: David Lee Steinlage, Ankeny, IA (US); Brian E. Myers, Altoona, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/828,525

(22) Filed: Apr. 6, 2001

(65) Prior Publication Data

US 2002/0144830 A1 Oct. 10, 2002

(51) Int. Cl.[7] ............................................... A01B 49/02
(52) U.S. Cl. ....................................... 172/196; 111/195
(58) Field of Search ................................. 172/196, 170, 172/171, 176; 111/190, 191, 194, 195

(56) References Cited

U.S. PATENT DOCUMENTS

| | | | | | |
|---|---|---|---|---|---|
| 363,602 | A | * | 5/1887 | Crane | 172/170 |
| 404,853 | A | * | 6/1889 | Mast | 172/170 |
| 1,106,879 | A | * | 8/1914 | Leischner | 172/171 |
| 1,329,375 | A | * | 2/1920 | Collins | 172/171 |
| 1,685,385 | A | * | 9/1928 | White | 111/58 |
| 2,842,078 | A | * | 7/1958 | Immesoete | 111/85 |
| 3,122,111 | A | * | 2/1964 | Taylor, Sr. | 111/80 |
| 4,261,593 | A | * | 4/1981 | Yeager | 280/415 R |
| 4,579,071 | A | * | 4/1986 | Johnson | 111/85 |
| 4,633,791 | A | * | 1/1987 | Linstrom et al. | 111/86 |
| 4,691,645 | A | * | 9/1987 | Anderson | 111/86 |
| 4,721,048 | A | * | 1/1988 | Fuss et al. | 111/85 |
| 4,762,075 | A | * | 8/1988 | Halford | 111/73 |
| 4,762,181 | A | * | 8/1988 | Cox | 172/196 |
| 4,926,767 | A | * | 5/1990 | Thomas | 111/187 |
| 5,060,585 | A | * | 10/1991 | Alexander | 111/89 |
| 5,161,472 | A | * | 11/1992 | Handy | 111/73 |
| 5,437,337 | A | | 8/1995 | Dietrich, Sr. | 172/196 |
| 5,540,288 | A | | 7/1996 | Dietrich, Sr. | 172/196 |
| 5,562,054 | A | * | 10/1996 | Ryan | 111/134 |
| 5,562,055 | A | * | 10/1996 | Peterson | 111/195 |
| 5,724,903 | A | * | 3/1998 | Yoder et al. | 111/194 |
| 5,906,166 | A | * | 5/1999 | Wagner | 111/170 |
| 6,012,534 | A | | 1/2000 | Kovach et al. | 172/196 |
| 6,142,085 | A | * | 11/2000 | Drever et al. | 111/151 |

FOREIGN PATENT DOCUMENTS

GB 2181933 * 10/1985 ............ A01C/7/04

* cited by examiner

*Primary Examiner*—Thomas B. Will
*Assistant Examiner*—Kristine M Markovich

(57) ABSTRACT

A leveling wheel assembly for a deep tillage ripper tool includes a support bracket fixed to the upper end of the ripper shank and a wheel support arm pivotally connected to the aft end of the bracket. Wheel support structure rotatably mounts a pair of leveling wheels offset several feet behind the ripper point. An adjustable downpressure spring provides an effective moment arm that decreases with spring compression to provide a generally constant downpressure as the wheels move vertically with respect to the shank over a substantial range of ripper depth changes and when large obstacles are encountered. The wheel support structure includes slots for adjusting the spacing of the leveling wheels and the angle of the wheels relative to the forward direction depending on soil conditions.

17 Claims, 3 Drawing Sheets

LEVELING WHEEL STRUCTURE FOR A MINIMUM TILLAGE RIPPER

FIELD OF THE INVENTION

The present invention relates to agricultural implements such as rippers, and more specifically to trailing leveling wheels for such an implement.

BACKGROUND OF THE INVENTION

In the past, straight shank rippers have been used to fracture soil without substantial destruction of the soil surface. These rippers were designed to eliminate soil compaction without inverting soil layers or significantly disturbing the surface residue. Farmers use these rippers because they want to have the root growth and water movement benefits from ripping the soil without being penalized with a loose, uneven and easily evaporated surface profile in the spring. Ripper points designed to reduce surface profile variability are shown, for example, in U.S. Pat. Nos. 5,437,337 and 5,540,288. The points leave the surface profile substantially undisturbed by not displacing fractured soil. Because the points are designed to leave surface profile generally unchanged, soil fracturing in the compaction layer is at a minimum. With little lateral movement of soil, the fracture zone is only a slot, and water intake and retention properties are compromised. An optimum seedbed for promoting good root growth is also compromised by the limited soil fracture characteristics of points that have little fractured soil displacement.

Straight toolbar, straight shank rippers with variable force closing/firming wheels have been used to fracture soil while maintaining a generally level soil surface. An example of such wheel structure is shown in U.S. Pat. No. 6,012,534. Such rippers typically utilize straight 0.75 inch thick ripper shanks, low soil disturbance points, and the closing/firming wheels. The shanks and points lift the entire soil profile without displacing a considerable amount of soil from the ripper slot. The wheels, which run closely adjacent the sides of the shank, contain the soil at a point where it begins to erupt due to the action of the point. The wheels push the loose soil back into the ripper channel thus leveling and sealing the ground for future crops. The wheels can also be used to shatter soil clods displaced by the ripper shank.

The closing/firming wheels firm soil that is still flowing over and around the ripper shank, and therefore the wheels are not able to firm the final soil profile. Therefore, a level profile is not achieved in some soil conditions. The relatively compact, closely coupled wheel arrangement has a very limited vertical movement range and hinders the ability to change force settings for a particular ripping depth. The downpressure mechanism has to be adjusted according to the selected ripping depth, and when the operator changes the ripping depth during operation the wheel downpressure will change substantially unless a time-consuming adjustment of individual downpressure mechanisms is made. The closely coupled wheels also hinder trash flow and promote residue plugging between the shank and the closing wheel arms. The limited working range of the wheels often results in shear bolt breakage when large surface obstructions are encountered. The closing wheels do not contact the ground until the ripper points penetrate the ground a substantial distance, and soil surface profile in the turn-row areas are adversely affected. The wheel mounting arrangement provides little or no angular adjustment of the wheels to vary the amount of soil pulled over the ripper slot.

SUMMARY OF THE INVENTION

It is therefore an object of the present invention to provide an improved leveling wheel assembly for a ripper. It is a further object to provide such an assembly which overcomes most or all of the above problems.

It is another object of the present invention to provide an improved leveling wheel assembly for a ripper which leaves a satisfactory soil surface profile in a variety of soil conditions. It is a further object to provide such an assembly which firms the final soil profile.

It is still another object of the present invention to provide an improved leveling wheel assembly for a ripper or similar agricultural implement which has improved downpressure characteristics when compared to at least most previously available leveling wheels. It is another object to provide such an assembly which obviates time-consuming downpressure adjustments when ripper depth is changed. It is still another object to provide such a mechanism which maintains the wheels a relatively constant distance behind the ripper shank as the ripper depth is changed.

It is yet a further object of the present invention to provide an improved leveling wheel assembly for a ripper having improved residue flow and reduced residue plugging problems. It is yet a further object to provide such an assembly which allows the soil and residue to settle prior to being firmed to provide a more level surface.

It is another object of the present invention to provide an improved leveling wheel assembly for a ripper wherein downpressure adjustments can be made quickly and easily for varying soil conditions. It is yet another object to provide such a mechanism wherein closing wheel spacing and angle relative to the direction of travel are easily adjustable and wherein the angle is adjustable over a larger range compared to at least most previously available leveling wheel assemblies to accommodate a wider variety of soil and trash conditions. It is yet another object to provide such an assembly with a simple downpressure adjustment.

It is yet another object of the present invention to provide an improved leveling wheel assembly for a deep tillage implement having a substantially larger vertical operating range compared to at least most previously available leveling wheel assemblies. It is still another object to provide such an assembly which contacts and levels the soil over a substantial range of vertical adjustment of the deep tillage implement and improves leveling in the turn-row areas where the implement is being lowered into or raised from the ground. It is a further object to provide such an assembly which reduces or eliminates the problem of shear pin breakage when large obstacles in the surface are encountered.

A leveling wheel assembly for a deep tillage tool such as a ripper includes a wheel support bracket fixed to the upper end of the ripper shank and extending rearwardly therefrom to an aft end located a substantial distance behind the rear edge of the shank. A wheel support arm pivotally connected to the aft end extends downwardly and rearwardly and is connected to wheel support structure rotatably mounting a pair of leveling wheels. An adjustable downpressure spring is supported between the aft end and the lower end of the wheel support arm and works through a three-bar linkage arrangement providing an effective moment arm that decreases as the spring compresses to provide a generally constant downpressure as the wheels move vertically with respect to the shank over a substantial range of ripper working depths. The wheel support structure includes slots for adjusting the spacing of the leveling wheels and the angle of the wheels relative to the forward direction and the horizontal.

The wheels level the soil several feet behind the point to allow the soil and trash to settle before contact so a more uniform surface is provided. The spacing between the wheels and ripper point also decreases the likelihood of residue hairpinning between the ripper shank and the closing wheels. The leveling wheel support arrangement provides closing wheel vertical travel of nearly 1.5 feet, and an operator can rip from 5.5 to 16 inches deep without having to make any closing wheel adjustments. They can also run over field obstructions nearly 23 inches above the ripper point without having to replace a shear bolt. The large vertical travel range of the wheels also allows for more level soil profiles on the turn-rows because the closing wheels contact the ground with less than half a foot of soil penetration.

The wheel angle adjustment provision allows the operator to vary closing wheel spacing several inches depending on soil blowout. Closing wheel angle relative to the direction of travel is also adjustable up to approximately 15 degrees to pull more or less soil over the ripper slot depending on soil conditions.

These and other objects, features and advantages of the present invention will become apparent to one skilled in the art upon reading the following detailed description in view of the drawings.

DESCRIPTION OF THE PREFERRED EMBODIMENT

Figure 1:
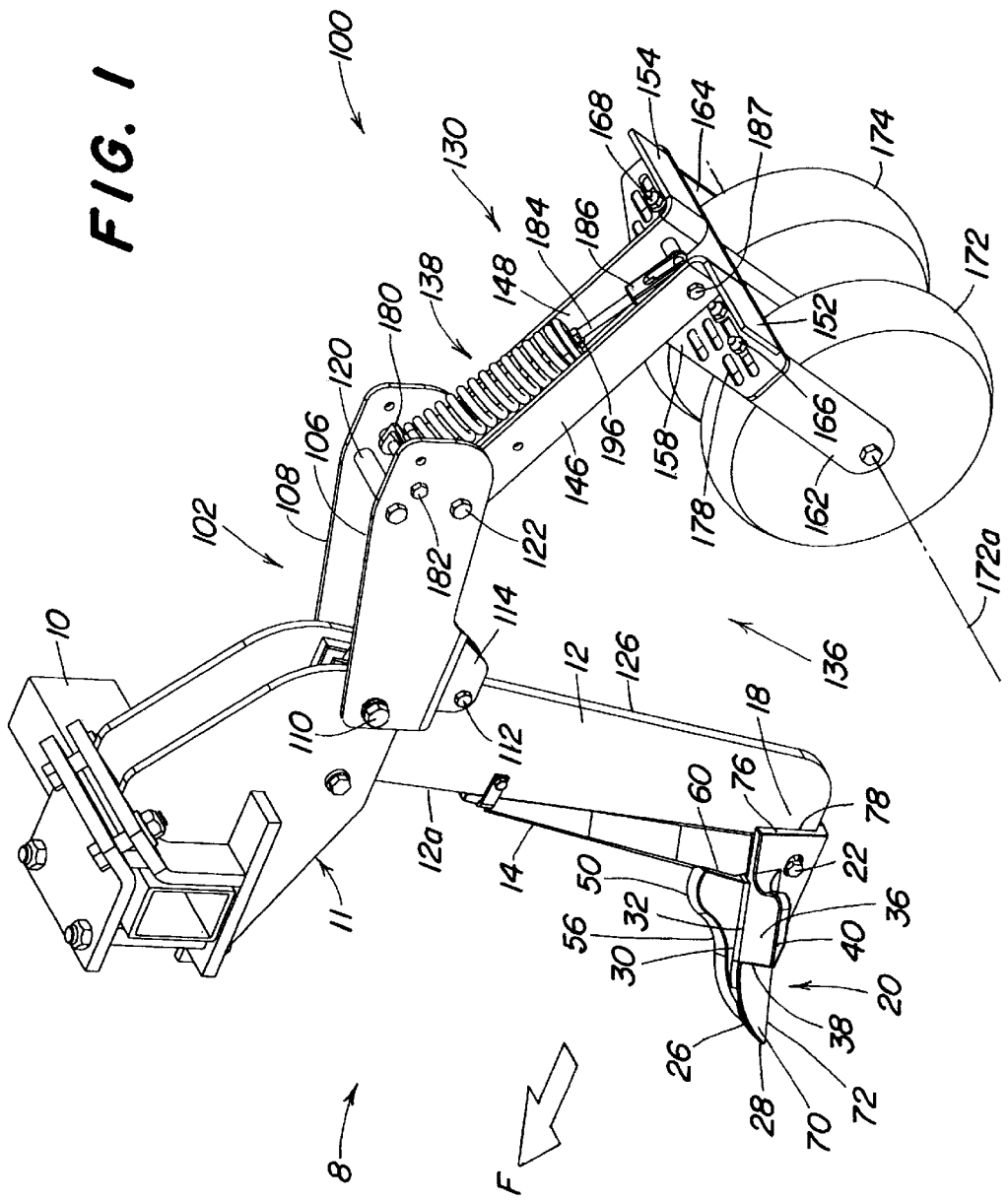
FIG. 1 is a perspective view of a ripper shank assembly with a leveling wheel assembly attached thereto.

Referring now to FIG. 1, therein is shown a ripper shank assembly 8 connected to a transversely extending and vertically adjustable implement frame 10 by a bracket assembly 11 for forward movement (F) through the soil. The shank assembly 8 includes an upright support plate or shank 12 of width of at least 0.75 inches. The plate 12 has leading and trailing edges 12a and 12b and supports a replaceable wear shin 14 at the lower end of the forward edge 12a. The shin 14 has a width generally identical to that of the plate 12 and forms a natural extension of the plate sides. The support plate 12 includes a lower connecting end 18 which projects forwardly under the shin 14. The connecting end 18 is apertured and receives a replaceable ripper point 20 secured to the plate 12 by a bolt assembly 22 which is inserted through the aperture. The point 20 typically is supported for operating relatively deeply below the surface of the soil, for example, in the compaction layer, and at relatively high speeds.

The ripper point 20 includes a narrow, elongated leading point portion 26 having a width no greater than approximately twice the width of the shank support plate 12 and, preferably, on the order of approximately 1.3 inches. The point portion 26 includes a forwardmost edge 28 at the lowermost extremity of the point 20. The top surface of the leading point portion 26 forms a relatively steep angle in the range of approximately 40–50 degrees with the horizontal when the point is in the field working position as shown. The leading point portion 26 curves gently rearwardly with a large radius of curvature from the forward edge 28 to an intermediate portion 30 having a top surface 32 which extends at an angle of approximately 15 degrees relative to the horizontal. Wings 36 extend outwardly and slightly downwardly from the intermediate portion 30 and have a top surface which forms a natural continuation of the top surface 32 of the intermediate portion 30. The top surfaces of the wings 36 also form an angle of approximately 15 degrees relative to the horizontal. The wings 36 have a generally parallelogram shape with forward edges 38 which diverge rearwardly at an acute angle to the transverse direction, and parallel side edges 40 of substantial length to maintain generally constant point width and configuration as the forward edges wear rearwardly. The forward portions of the wings 36 are chamfered so a leading bottom portion is generally horizontal in the working position of the point 20. The leading edges 38 of the wings 36 are offset a considerable distance behind the edge 28. The offset between the edges 28 and 38 is preferably on the order of 6 inches.

A centrally located vertical fin 50 having a width of approximately half the width of the leading point portion 26, or the approximate width of the shank plate 12, extends upwardly from the leading point portion 26 rearwardly and above the forward edge 28 and forwardly of the leading edges 38 of the wings 36. The forward portion of the fin 50 projects a small distance above the top surface of the leading point portion 26, and fin height increases in the rearward direction. The central portion of the fin 50 curves upwardly at a location 56 near the forward portion of the wings 36. From the location 56, the fin 50 curves rearwardly and extends to a terminating surface or edge 60 generally aligned with trailing edges of the wings 36 and parallel to and generally abutting the leading edge of the shank assembly 14. The top of the fin 50 at the edge 60 is approximately 3 inches above the top surfaces of the wings 36.

The point 20 includes a lower body portion 70 having a bottom surface 72 which angles downwardly relative to the top surface of the leading point portion 26 to define side profile (FIGS. 1 and 2) which increases in height from the forward edge 28 to the intermediate portion 30. The bottom surface 72 extends rearwardly in generally a horizontal attitude at the intermediate portion 30 to a rearmost edge location 76 behind the rear edge 60 of the fin 50. The lower body portion 70 is notched at 78 to define a shank-receiving area generally behind and below the rear edge 60 of the fin 50. Apertures 80 in the sides of the notched area 78 receive the bolt structure 22 which attaches the point 20 to the lower end of a shank assembly 10. The sides of the notched area 78 embrace the sides of the connecting end 18 of the shank plate 12 and position the rear edge 60 of the fin 50 closely adjacent the front edge of the wear shin 14.

The construction of the leading point 26, which is described in our copending and commonly assigned application entitled MINIMUM TILLAGE RIPPER POINT WITH FIN filed concurrently with the present application, provides good ground entry and vertical holding force in the compaction layer. The fin 50 pre-fractures soil and initiates substantial lateral displacement of the soil prior to the soil coming into contact with the wings 36. The fin 50 also parts the soil before the soil contacts the shank. The wings 36 lift the soil and provide additional fracturing above and outwardly of the point 20 for improved water penetration and retention and increased root growth. The point profile establishes the vertical force necessary to maintain a consistent working depth within the compaction layer. Although the point 20 reduces soil surface disturbance when compared with many previously available points, the reduction may be insufficient to provide a sufficiently level surface to avoid a leveling pass with a field cultivator or similar implement prior to planting. Although a particular point 20 and shank 12 are shown, it is to be understood that other types of ripper points and shanks may also be used, and the above are given by way of example only.

To provide surface leveling and filling function for the slot formed by the assembly 8, a leveling wheel assembly 100 is connected to the implement and trails the shank 12. The assembly 100 includes a support 102 which extends horizontally rearwardly to an aft end located a substantial distance behind the top of the shank 12, the distance being preferably greater than about a foot. The support 102 includes fore-and-aft extending side plates 106 and 108 connected to the bracket assembly 11 by a rear connecting bolt 110 which also supports the upper end of the shank 12 from the bracket assembly 11, and a lower bolt 112 which extends though the shank 12 and through inwardly offset, lower flanges 114 which project downwardly from the plates 106 and 108. The aft ends of the plates 106 and 108 are transversely fixed relative to each other by an upper spacer bolt assembly 120 and a lower pivot assembly 122 which is generally aligned with the top of the shank 12.

A fore-and-aft extending wheel arm 130 is pivotally connected at an upper forward end to the pivot assembly 122 and includes a lower aft end connected to leveling wheel structure 134. The wheel arm 130 is relatively long and has a pivot range allowing the leveling wheel structure to move vertically relative to the shank 12 over a vertical range greater than the normal range of operating depths of the point 20 which is approximately 12 inches or more. The rearwardly directed support 102 and wheel arm 130 provide an open accommodation space indicated generally at 136 so trash and soil can flow freely behind the shank 12 with little or no plugging. An adjustable downpressure spring assembly 138 connected between the support 102 and the wheel structure 134 provides a generally constant pressure of the leveling wheel structure 134 against the soil surface as the working depth of the point 20 is changed. The wheel structure 134 trails the point 20 a substantial distance, preferably more than 3 feet, so that soil and trash erupting from the point and the shank 12 settle before being leveled and firmed by the wheel structure 134.

The wheel arm 130 includes side arm members 146 and 148 pivotally connected at forward upper ends by the pivot assembly 122 between the side plates 106 and 108. Lower ends 152 and 154 of the members 146 and 148 are bent outwardly at an angle of approximately 90 degrees. A slotted support plate 158 is fixed to the end of the wheel arm 130 and abuts the bottom of the ends 152 and 154 and of the aft ends of the members 146 and 148. Yokes 162 and 164 include upper bight portions connected by bolts 166 and 168 to the plate 158. Transversely spaced wheels 172 and 174 are connected between the sidelegs of the yokes 162 and 164 for rotation about axes 172a and 174a and rotate on opposite sides of the slot in the soil formed by the shank 12.

The plate 158 includes a series of slots 178 so the transverse spacing of the wheels 172 and 174 and the angle of the wheels relative to the forward direction can be changed by placing the bolts 166 and 168 at different locations along the slots 178 and/or inserting one or two of the bolts in different slots. As shown, the wheel axes 172a and 174a are parallel. By changing the slots through which the innermost bolts 158 and 168 are inserted, the wheel axes 172a and 174a can be angled outwardly in the forward direction as necessary to more aggressively pull soil over the slot formed in the soil by the ripper shank assembly 8. Preferably, the wheels 172 and 174 can be angled outwardly from the forward direction by up to at least 15 degrees for aggressive soil pulling action. The wheel spacing can be quickly changed for varying soil blowout conditions by simply loosening the bolts 166 and 168 and sliding the yokes inwardly or outwardly to the desired spacing and then tightening the bolts to establish firm yoke connections. In an alternate embodiment, generally fore-and-aft extending slots (not shown) are provided in the bight portion of the yokes 162 and 164 to receive the bolts 166, 168 rather than providing extra slots in the plate 158 for angular adjustments. To make transverse and/or angular adjustments of the wheels 172 and 174, the operator simply has to loosen the two bolts 166, 168 on each side and position the yokes 162 and 164 as desired. When the yokes are positioned, the bolts are again tightened to secure the wheels in the selected positions. An infinite range of angular adjustments are possible, and no bolts need be removed for making a change in wheel angle and/or spacing.

Figure 3:
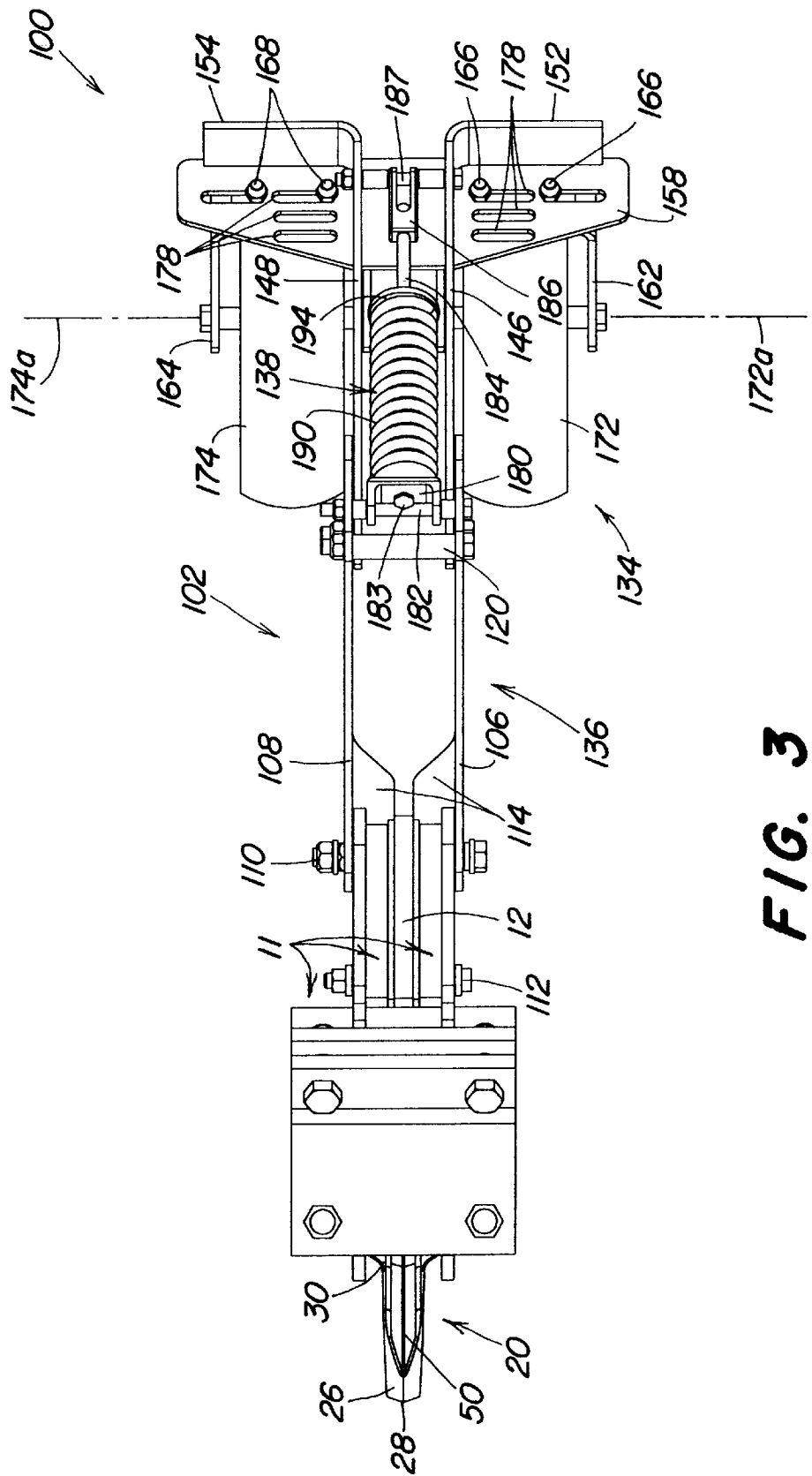
FIG. 3 is a top view of the ripper point of FIG. 1.

The downpressure spring assembly 138 includes an upper spring abutment member 180 pivotally connected between the aft ends of the plates 106 and 108 by a pivot bolt 182 at a location offset above and slightly forwardly of the pivot assembly 122. The headed end 183 (FIG. 3) of a threaded tension link 184 is slidably received through the member 180 and includes a lower aft end 186 pivotally connected to the lower aft end of the wheel arm 130 by a pivot bolt assembly 187. A coil spring 190 encircles the forward portion of the tension link 184 and is adjustably compressed between the upper spring abutment member 180 and a lower abutment member 194 adjustably positionable along the tension link 184 by a pair of nuts 196 (FIG. 1) threaded onto the link. The headed end 183 of the tension link 184 contacts the upper spring abutment member 180 and limits downward pivoting of the wheel arm 130 to a lowermost position relative to the shank 12 when the frame 10 is lifted for transport. When the wheel arm 130 rocks upwardly, the headed end 183 of the tension link 184 slides upwardly through the member 180, and the spring 190 is compressed between the members 180 and 194.

As the spring 190 is compressed with upward movement of the wheels 172 and 174, there is a corresponding decrease in the effective moment arm through which the spring 190 operates (that is, the distance between the axis of the tension link and the elongate arm axis which extends through the pivot assembly 122, as measured along a line perpendicular to the elongate arm axis and passing through the pivot bolt 182). The geometry as shown provides a generally constant downpressure over substantially the entire vertical range of movement of the wheels 172 and 174. In an uppermost working position of the wheel arm 130 (broken lines of FIG. 2), the elongate arm axis is approximately horizontal. The vertical range of motion of the wheels 172 and 174 in the embodiment shown is more than about 12 inches and preferably about 18 inches or more, and the wheels 172 and 174 remain in contact with the soil with generally a constant downpressure over the entire working depth range of the point 20. Obstacles up to 23 inches above the level of the ripper point 20 can be cleared without shear pin breakage. To adjust the downpressure, the operator simply rotates the nuts 196 to increase or decrease the precompression of the spring 190 in the fully lowered position of the wheels 172 and 174.

Figure 2:
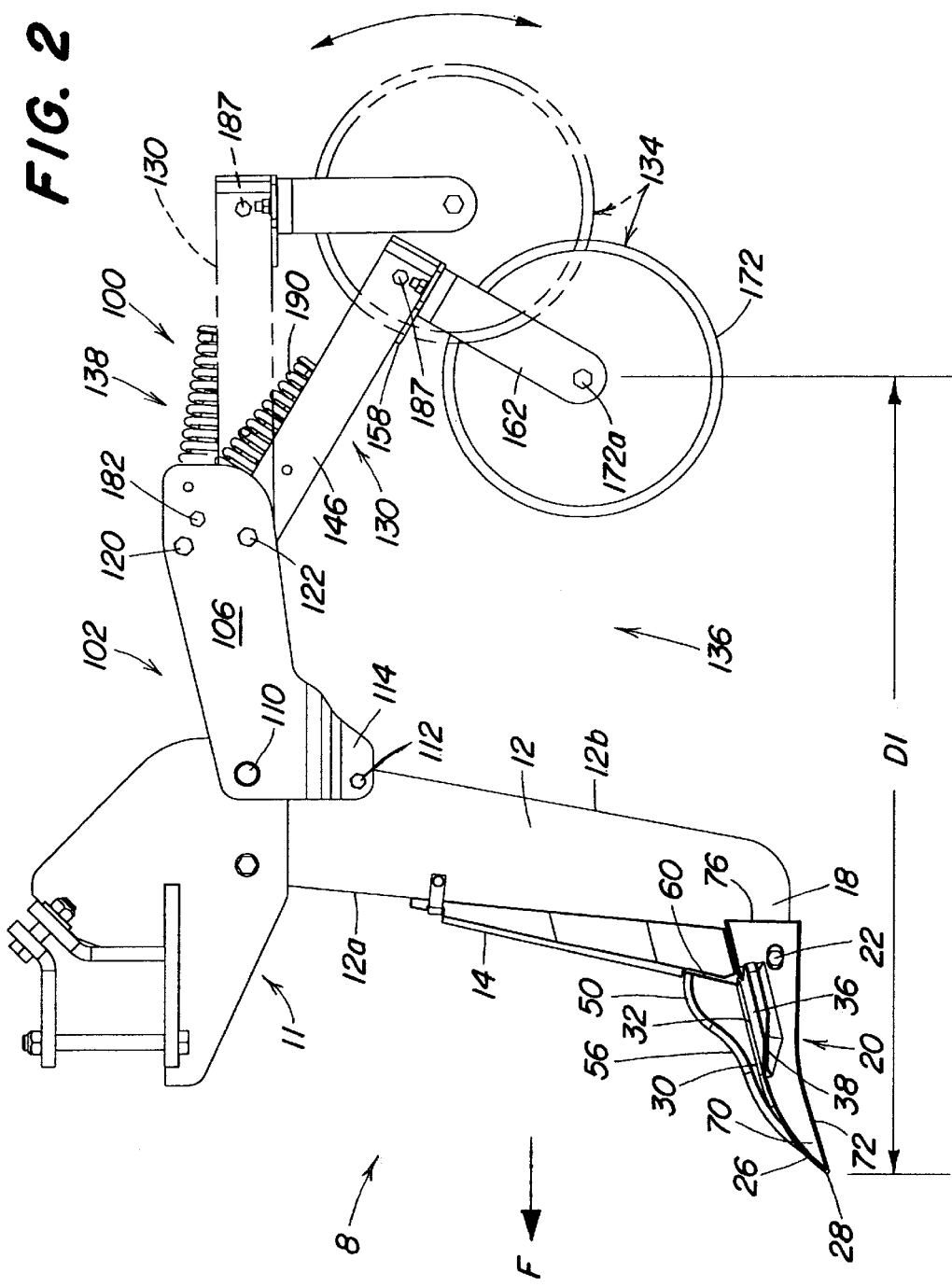
FIG. 2 is a side view of the assembly of FIG. 1.

As seen in FIG. 2, the spacing between the rear shank edge 12b and the forwardmost extremities of the circumferences of the wheels 172 and 174 is greater than the diameter of the wheels. In the preferred embodiment, the distance D1 between the wheel axes 172a, 174a and the forward portion of the point 20 is greater than four feet in the operating position of the ripper shank assembly and approaches four and one-half feet or more. The spacing allows erupting soil and trash to settle prior to contact of the raised portion of the soil surface by the wheels 172 and 174. The large vertical range of firming wheel movement assures wheel contact and firming, leveling and slot-closing action over the entire operating range of the point 20 and as the implement is lowered into or raised from the ground so turn-row areas have more uniform soil surface. The range also provides good protection for the assembly when a large obstacle is encountered.

Having described the preferred embodiment, it will become apparent that various modifications can be made without departing from the scope of the invention as defined in the accompanying claims.

We claim:

1. A deep tillage implement having an upright shank with upper and lower ends and leading and trailing edges, the shank supported by a frame for forward movement through soil and a soil working point connected to the lower end of the shank for movement a distance below the surface of the soil in the forward direction, the distance variable over a preselected range of point working depths, the point and shank opening a slit in the soil and causing loosening and other disruption of the soil surface and surface trash during such forward movement, and a wheel assembly for leveling the loosened and disrupted surface behind the shank, the wheel assembly comprising:

a support extending rearwardly of an upper portion of the shank;

a wheel arm pivotally connected to the support at a location adjacent the upper portion of the shank and extending rearwardly and downwardly to a lower aft end;

a leveling wheel connected to the lower end and having a preselected diameter and a circumference, the forward-most portion of the circumference located a substantial distance behind the trailing edge of the shank so that the soil surface and trash settle prior to contact by the leveling wheel; and a downpressure spring assembly connected to the wheel arm and providing generally constant pressure of the leveling wheel against the soil surface as the working depth is changed.

2. The implement as set forth in claim 1 wherein the leveling wheel comprises first and second wheels offset laterally from each other, and adjustable angle connections located between the first and second wheels and the wheel arm and providing at least 15 degrees of adjustment of the first and second wheels relative to the forward direction.

3. A deep tillage implement having an upright shank with upper and lower ends and leading and trailing edges, the shank supported by a frame for forward movement through soil and a soil working point connected to the lower end of the shank for movement a distance below the surface of the soil in the forward direction, the distance variable over a preselected range of point working depths, the point and shank opening a slit in the soil and causing loosening and other disruption of the soil surface and surface trash during such forward movement, and a wheel assembly for leveling the loosened and disrupted surface behind the shank, the wheel assembly comprising:

a support extending rearwardly of an upper portion of the shank;

a wheel arm pivotally connected to the support and extending rearwardly and downwardly to a lower aft end;

a leveling wheel connected to the lower end and having a preselected diameter and a circumference, the forward-most portion of the circumference located a substantial distance behind the trailing edge of the shank so that the soil surface and trash settle prior to contact by the leveling wheel; a downpressure spring assembly connected to the wheel arm and providing generally constant pressure of the leveling wheel against the soil surface as the working depth is changed; and wherein the leveling wheel is located more than four feet behind a leading edge of the soil working point.

4. A deep tillage implement having an upright shank with upper and lower ends and leading and trailing edges, the shank supported by a frame for forward movement through soil and a soil working point connected to the lower end of the shank for movement a distance below the surface of the soil in the forward direction, the distance variable over a preselected range of point working depths, the point and shank opening a slit in the soil and causing loosening and other disruption of the soil surface and surface trash during such forward movement, and a wheel assembly for leveling the loosened and disrupted surface behind the shank, the wheel assembly comprising:

a support extending rearwardly of an upper portion of the shank;

a wheel arm pivotally connected to the support and extending rearwardly and downwardly to a lower aft end;

a leveling wheel connected to the lower end and having a preselected diameter and a circumference, the forward-most portion of the circumference located a substantial distance behind the trailing edge of the shank so that the soil surface and trash settle prior to contact by the leveling wheel; a downpressure spring assembly connected to the wheel arm and providing generally constant pressure of the leveling wheel against the soil surface as the working depth is changed; and wherein the lower aft end of the wheel arm has a vertical travel of greater than one foot.

5. A deep tillage implement having an upright shank with upper and lower ends and leading and trailing edges, the shank supported by a frame for forward movement through soil and a soil working point connected to the lower end of the shank for movement a distance below the surface of the soil in the forward direction, the distance variable over a preselected range of point working depths, the point and shank opening a slit in the soil and causing loosening and other disruption of the soil surface and surface trash during such forward movement, and a wheel assembly for leveling the loosened and disrupted surface behind the shank, the wheel assembly comprising:

a support extending rearwardly of an upper portion of the shank;

a wheel arm pivotally connected to the support and extending rearwardly and downwardly to a lower aft end;

a leveling wheel connected to the lower end and having a preselected diameter and a circumference, the forward-most portion of the circumference located a substantial distance behind the trailing edge of the shank so that the soil surface and trash settle prior to contact by the leveling wheel; a downpressure spring assembly connected to the wheel arm and providing generally constant pressure of the leveling wheel against the soil surface as the working depth is changed; and including an adjustable angle connection located between the leveling wheel and the wheel arm and providing at least 15° of adjustment of the leveling wheel relative to the forward direction.

6. A deep tillage implement having an upright shank with upper and lower ends and leading and trailing edges, the shank supported by a frame for forward movement through soil and a soil working point connected to the lower end of the shank for movement a distance below the surface of the soil in the forward direction, the distance variable over a preselected range of point working depths, the point and shank opening a slit in the soil and causing loosening and other disruption of the soil surface and surface trash during such forward movement, and a wheel assembly for leveling the loosened and disrupted surface behind the shank, the wheel assembly comprising:

a support extending rearwardly of an upper portion of the shank;

a wheel arm pivotally connected to the support and extending rearwardly and downwardly to a lower aft end;

a leveling wheel connected to the lower end and having a preselected diameter and a circumference, the forwardmost portion of the circumference located a substantial distance behind the trailing edge of the shank so that the soil surface and trash settle prior to contact by the leveling wheel; a downpressure assembly connected to the wheel arm and maintaining biasing of the leveling wheel against the soil surface as the working depth is changed; and wherein the lower aft end of the wheel arm has a vertical range of travel of greater than one foot and the leveling wheel is offset a distance behind the rear edge of the shank the distance equal at least to the diameter of the leveling wheel.

7. The implement as set forth in claim 6 wherein the leveling wheel has an axis of rotation adjustable relative to a direction transverse to the forward direction over a range of approximately 15 degrees.

8. A deep tillage tool having an upright shank with upper and lower ends and leading and trailing edges, the shank supported by a frame for forward movement through soil and a soil working point connected to the lower end of the shank for forward movement a distance below the surface of the soil, the distance variable over a preselected range of point working depths, the tool and shank opening a slit in the soil and causing loosening and other disruption of the soil surface and surface trash during such forward movement, and a wheel assembly for leveling the loosened and disrupted surface behind the shank, the wheel assembly comprising:

a support extending rearwardly of the upper end of the shank;

an elongated fore-and-aft extending wheel arm including a forward end pivotally connected to the support at a location adjacent the upper end of the shank and extending rearwardly and downwardly to a lower aft end;

leveling wheel structure connected to the lower end and having a leveling wheel with circumference, the wheel rotatable about an axis generally perpendicular to the forward direction, and wherein the forwardmost portion of the circumference is located behind the trailing edge of the shank so that the soil surface and trash settle prior to contact by the leveling wheel; and a downpressure assembly connected to the wheel arm and providing generally constant pressure of the leveling wheel against the soil surface as the wheel arm pivots and the leveling wheel structure moves vertically relative to the shank; wherein the wheel arm has a length providing vertical movement of the aft end of the arm over a range approximately equal to the range of point working depths so that the leveling wheel remains in contact with the soil surface over substantially the entire range of working depths.

9. The implement as set forth in claim 8 wherein the downpressure assembly includes a spring biasing the leveling wheel downwardly relative to the shank, the spring operating through an effective moment arm that decreases with increasing spring pressure.

10. The implement as set forth in claim 9 further comprising an adjustable spring compression member for adjusting the pressure of the leveling wheel against the soil surface.

11. The implement as set forth in claim 8 wherein the wheel arm maintains the leveling wheel a generally constant distance behind the trailing edge of the shank over substantially the entire range of working depths.

12. The implement as set forth in claim 8 wherein the support includes an aft end located rearwardly and above the rear edge of the shank, and a pivot connecting the forward end of the wheel arm to the aft end of the support, the support and wheel arm providing a substantial accommodation space for trash and soil flow behind the shank to thereby help prevent plugging between the shank and leveling wheel.

13. The implement as set forth in claim 12 wherein the wheel arm, when the working depth is at a maximum, is substantially horizontal.

14. The implement as set forth in claim 8 wherein the leveling wheel structure includes a pair of laterally offset leveling wheels, each having an axis of rotation, adapted to work on opposite sides of the slot, wherein the leveling wheel structure includes adjustment structure for varying the lateral spacing of the leveling wheels.

15. A deep tillage tool having an upright shank with upper and lower ends and leading and trailing edges, the shank supported by a frame for forward movement through soil and a soil working point connected to the lower end of the shank for forward movement a distance below the surface of the soil, the distance variable over a preselected range of point working depths, the tool and shank opening a slit in the soil and causing loosening and other disruption of the soil surface and surface trash during such forward movement, and a wheel assembly for leveling the loosened and disrupted surface behind the shank, the wheel assembly comprising:

a support extending rearwardly of the upper end of the shank;

an elongated fore-and-aft extending wheel arm including a forward end pivotally connected to the support and extending rearwardly and downwardly to a lower aft end;

leveling wheel structure connected to the lower end and having a leveling wheel with circumference, the wheel rotatable about an axis generally perpendicular to the forward direction, and wherein the forwardmost portion of the circumference is located behind the trailing edge of the shank so that the soil surface and trash settle prior to contact by the leveling wheel; and a downpressure assembly connected to the wheel arm and providing generally constant pressure of the leveling wheel against the soil surface as the wheel arm pivots and the leveling wheel structure moves vertically relative to the shank; wherein the wheel arm has a length providing vertical movement of the aft end of the arm over a range approximately equal to the range of point working depths so that the leveling wheel remains in contact with the soil surface over substantially the entire range of working depths; and wherein the wheel arm maintains the axis of the leveling wheel a distance of approximately 4 feet behind a leading edge of the point.

16. A deep tillage tool having an upright shank with upper and lower ends and leading and trailing edges, the shank supported by a frame for forward movement through soil and a soil working point connected to the lower end of the shank for forward movement a distance below the surface of the soil, the distance variable over a preselected range of point working depths, the tool and shank opening a slit in the soil and causing loosening and other disruption of the soil surface and surface trash during such forward movement, and a wheel assembly for leveling the loosened and disrupted surface behind the shank, the wheel assembly comprising:

a support extending rearwardly of the upper end of the shank;

an elongated fore-and-aft extending wheel arm including a forward end pivotally connected to the support and extending rearwardly and downwardly to a lower aft end;

leveling wheel structure connected to the lower end and having a leveling wheel with circumference, the wheel rotatable about an axis generally perpendicular to the forward direction, and wherein the forwardmost portion of the circumference is located behind the trailing edge of the shank so that the soil surface and trash settle prior to contact by the leveling wheel; and a downpressure assembly connected to the wheel arm and providing generally constant pressure of the leveling wheel against the soil surface as the wheel arm pivots and the leveling wheel structure moves vertically relative to the shank; wherein the wheel arm has a length providing vertical movement of the aft end of the arm over a range approximately equal to the range of point working depths so that the leveling wheel remains in contact with the soil surface over substantially the entire range of working depths; and wherein the leveling wheel structure includes angle adjustment structure providing adjustment of the leveling wheel over a range of angles including a first angle wherein the axis is generally perpendicular to the forward direction of travel and a second angle offset at least approximately 15 degrees from the first angle, thereby varying aggressiveness of the leveling wheel to move soil towards the slot.

17. A deep tillage tool having an upright shank with upper and lower ends and leading and trailing edges, the shank supported by a frame for forward movement through soil and a soil working point connected to the lower end of the shank for forward movement a distance below the surface of the soil, the distance variable over a preselected range of point working depths, the tool and shank opening a slit in the soil and causing loosening and other disruption of the soil surface and surface trash during such forward movement, and a wheel assembly for leveling the loosened and disrupted surface behind the shank, the wheel assembly comprising:

a support extending rearwardly of the upper end of the shank;

an elongated fore-and-aft extending wheel arm including a forward end pivotally connected to the support and extending rearwardly and downwardly to a lower aft end;

leveling wheel structure connected to the lower end and having a leveling wheel with circumference, the wheel rotatable about an axis generally perpendicular to the forward direction, and wherein the forwardmost portion of the circumference is located behind the trailing edge of the shank so that the soil surface and trash settle prior to contact by the leveling wheel;

a downpressure assembly connected to the wheel arm and providing generally constant pressure of the leveling wheel against the soil surface as the wheel arm pivots and the leveling wheel structure moves vertically relative to the shank; wherein the wheel arm has a length providing vertical movement of the aft end of the arm over a range approximately equal to the range of point working depths so that the leveling wheel remains in contact with the soil surface over substantially the entire range of working depths;

wherein the leveling wheel structure includes a pair of laterally offset leveling wheels, each having an axis of rotation, adapted to work on opposite sides of the slot, wherein the leveling wheel structure includes adjustment structure for varying the lateral spacing of the leveling wheels; and wherein the leveling wheel structure includes angle adjustment structure for varying the angle of the axis of rotation to thereby vary aggressiveness of the leveling wheel to move soil towards the slot.

* * * * *